(12) United States Patent
Ando

(10) Patent No.: US 6,712,188 B2
(45) Date of Patent: Mar. 30, 2004

(54) ONEWAY CLUTCH DEVICE

(75) Inventor: Tomoharu Ando, Fukuroi (JP)

(73) Assignee: NSK-Warner, K.K., Tokyo (JP)

( * ) Notice: Subject to any disclaimer, the term of this patent is extended or adjusted under 35 U.S.C. 154(b) by 0 days.

(21) Appl. No.: 10/098,345

(22) Filed: Mar. 18, 2002

(65) Prior Publication Data

US 2002/0134636 A1 Sep. 26, 2002

(30) Foreign Application Priority Data

Mar. 21, 2001 (JP) ........................................ 2001-080875
Aug. 8, 2001 (JP) ........................................ 2001-240946

(51) Int. Cl.[7] ........................ F16D 15/00; F16D 41/067
(52) U.S. Cl. ...................................................... 192/45
(58) Field of Search ............................... 192/45, 110 B, 192/45.1

(56) References Cited

U.S. PATENT DOCUMENTS

| | | | | |
|---|---|---|---|---|
| 4,088,211 A | * | 5/1978 | Doller et al. ................. | 192/45 |
| 4,724,940 A | * | 2/1988 | Lederman ..................... | 195/45 |
| 4,821,856 A | * | 4/1989 | Lederman ..................... | 192/45 |
| 4,830,157 A | * | 5/1989 | Lederman ..................... | 192/45 |
| 5,070,977 A | * | 12/1991 | Lederman ..................... | 192/45 |
| 5,101,946 A | * | 4/1992 | Lederman ..................... | 192/45 |
| 5,273,144 A | * | 12/1993 | Papania ....................... | 192/45 |
| 5,603,394 A | * | 2/1997 | Joppeck ....................... | 192/45 |
| 6,092,636 A | * | 7/2000 | Muramatsu .................... | 192/45 |
| 6,095,693 A | * | 8/2000 | Fujiwara ...................... | 192/45 |
| 6,338,402 B1 | * | 1/2002 | Muramatsu et al. ............. | 192/45 |

* cited by examiner

Primary Examiner—Rodney H. Bonck
Assistant Examiner—Eric M. Williams
(74) Attorney, Agent, or Firm—Miles & Stockbridge P.C.; Nelson H. Shapiro

(57) ABSTRACT

A oneway clutch device comprises a plurality of rollers interposed between an inner race and an outer race for carrying out torque transmission only at the time of relative rotation in one direction between the inner race and the outer race, springs for biasing these rollers in a direction of engagement, and a retainer having an annular portion to be fitted on the inner race for retaining the rollers and the springs. The retainer is formed with a roller latching piece formed for holding the rollers biased by the springs, together with the inner race in a state that it is not assembled in the outer race.

8 Claims, 14 Drawing Sheets

ONEWAY CLUTCH DEVICE

This application claims the benefit of Japanese Patent applications No. 2001-080875 and No. 2001-240946 which are hereby incorporated by reference.

BACKGROUND OF THE INVENTION

1. Field of the Invention

The present invention relates to a oneway clutch device for use in an automatic transmission, or the like, of an automobile, and more specifically, to a technology for facilitating a conveyance of clutch device subassemblies.

2. Related Background Art

Generally, an automatic transmission of an automobile is provided with, in addition to a torque converter which serves as a fluid coupling, a planetary geared transmission with three to five speed levels which carries out gear transmission by properly fixing or releasing the constituent elements (including a sun gear, or a planetary gear) of the planetary geared transmission by the use of frictional engagement means such as a clutch or a brake. As the frictional engagement means to be incorporated in the automatic transmission, a wet type multiple disc type device in which frictional plates and separator plates are alternately arranged is employed, except in band brakes of a certain type. A pressure oil from a transmission control oil hydraulic circuit is employed in the pressure contact (frictional engagement) between the both plates. Also as these frictional engagement means, there is partially employed a member having a oneway clutch device arranged therein for realizing easy control on the transmission by freely rotating a gear shaft in one direction of rotation.

FIG. 20 is a view for showing a longitudinal cross section of the essential portion of a oneway clutch device of a sprag type which is to be incorporated in the frictional engagement means. Referring to FIG. 20, the oneway clutch device 121 is composed of an inner race 5 which has an oil path 123 formed to open on the outer peripheral surface thereof, an outer race 9 which is rotatably supported coaxially and relatively with respect to this inner race 5, and a oneway clutch mechanism 125 interposed between the inner race 5 and the outer race 9. The oneway clutch mechanism 125 comprises a large number of sprags 127 serving as torque transmitting members, a ribbon spring 129 for holding the sprags 127 and, at the same time, for biasing the same in a direction of engagement, an outer retainer 131 for annularly retaining the ribbon spring 129, an inner retainer 133 for suppressing an excessive inclination of the sprags 127 together with the outer retainer 131, a pair of end bearings 135, 135 for holding the both retainers 131 and 133 with a predetermined distance therebetween so as to secure an operation of the sprags 127, and side plates 137 and 139 for restricting the axial movement of each of these components.

Oneway clutch devices 121 of this type are usually used in a state in which the inner race 5 is rotated while the outer race 9 is fixed, but also often used in a state in which the inner race 5 is fixed and the outer race 9 is rotated. In the latter case, lubricating oil can hardly flow between the inner race 5 and the sprags 127 or the end bearings 135, so that there may occur friction or scorching on a sliding surface due to poor lubrication. In addition, the end bearings 135 require high precision, so that the processing cost thereof is high, which is a factor for increasing a unit price of the oneway clutch device 121. Accordingly, employment of a oneway clutch device of a roller type is discussed in which rollers are interposed between the inner race and the outer race and a cam surface is formed on the inner race side. A oneway clutch device of the roller type comprises as its constituent parts springs for biasing the rollers to a direction of engagement, block bearings for forming a predetermined gap between the inner race and the outer race, and a retainer fitted on the inner race for retaining the rollers, springs and the block bearings.

With this roller type oneway clutch device, the problems described above can be solved, and at the same time, dragging torque in idling operation can be reduced. However, this roller type oneway clutch device has another problem that some of the constituent parts easily fall off in conveyance. More specifically, in the roller type oneway clutch device, the outer race as its constituent part serves as the output shaft or the input shaft of the automatic transmission, or the like, so that the outer race does not exist in the matter of course as a subassembly prior to the assembly of the automatic transmission or the like. Accordingly, if any impact is applied when the subassembly is conveyed, any of the rollers, the springs or the block bearings assembled in the inner race or the retainer falls off comparatively easily. In this case, a product must be rejected and is required to be disposed, which results in a lower working efficiency.

SUMMARY OF THE INVENTION

The present invention is contrived taking the above circumstances into consideration and its object is to provide a oneway clutch device capable of securely retaining its constituent parts by the use of a retainer, thereby enhancing the working efficiency in assembly.

In order to achieve the above object, according to a first aspect of the invention, there is proposed a oneway clutch device which comprises a plurality of rollers interposed between an inner race and an outer race for carrying out torque transmission only at the time of relative rotation in one direction between the inner race and the outer race, springs for biasing these rollers in a direction of engagement, and a retainer having an annular portion to be fitted on the inner race for retaining the rollers and the springs, wherein said retainer is formed with a roller latching piece formed for holding the rollers biased by said springs, together with said inner race in a state that it is not assembled in said outer race.

According to the first aspect of the invention, even if any impact is applied in conveyance of a subassembly, the rollers which are held by and between the roller latching piece of the retainer and the inner race do not fall off easily.

According to a second aspect of the present invention, there is proposed a oneway clutch device which comprises a plurality of rollers interposed between an inner race and an outer race for carrying out torque transmission only at the time of relative rotation in one direction between the inner race and the outer race, springs for biasing these rollers in a direction of engagement, and a retainer having an annular portion to be fitted on the inner race for retaining the rollers and the springs, wherein said retainer is provided with spring latching means formed for latching said springs.

According to the second aspect of the invention, even if any impact is applied in conveyance of a subassembly or in driving, the spring which is latched by said spring latching means of the retainer does not fall off easily.

According to a third aspect of the present invention, there is proposed a oneway clutch device which comprises a plurality of rollers interposed between an inner race and an outer race for carrying out torque transmission only at the time of relative rotation in one direction between the inner race and the outer race, springs for biasing these rollers in a direction of engagement, a block bearing for forming a predetermined gap between the inner race and the outer race, and a retainer having an annular portion to be fitted on the inner race for retaining the rollers, the springs and the block bearing, wherein said retainer is formed with a block bearing pressing piece formed for holding the block bearing together with said inner race in a state that it is not assembled in said outer race.

According to the third aspect of the invention, even if any impact is applied in conveyance of a subassembly or in driving, the block bearing which is held by and between the block bearing pressing piece of the retainer and the inner race does not fall off easily.

In addition, according to the oneway clutch of the present invention, said retainer may be formed of synthetic resin.

According to this aspect, even if the retainer has a comparatively complicated configuration, the manufacturing thereof can be carried out easily by using a metallic mold and, at the same time, the weight thereof can be reduced.

DETAILED DESCRIPTION OF THE PREFERRED EMBODIMENTS

Figure 1:
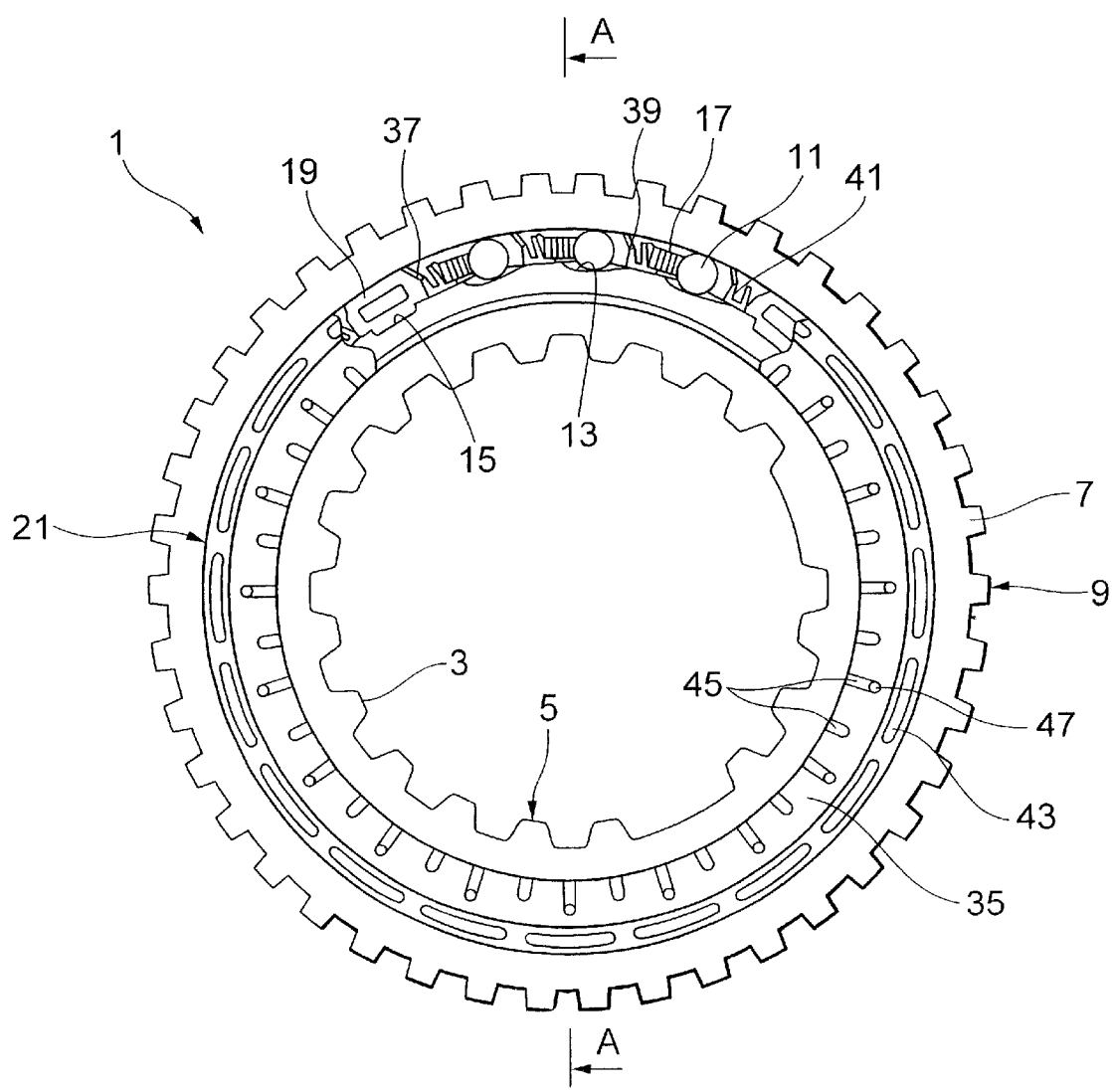
FIG. 1 is a front view of a oneway clutch device according to a first embodiment of the present invention.
Figure 2:
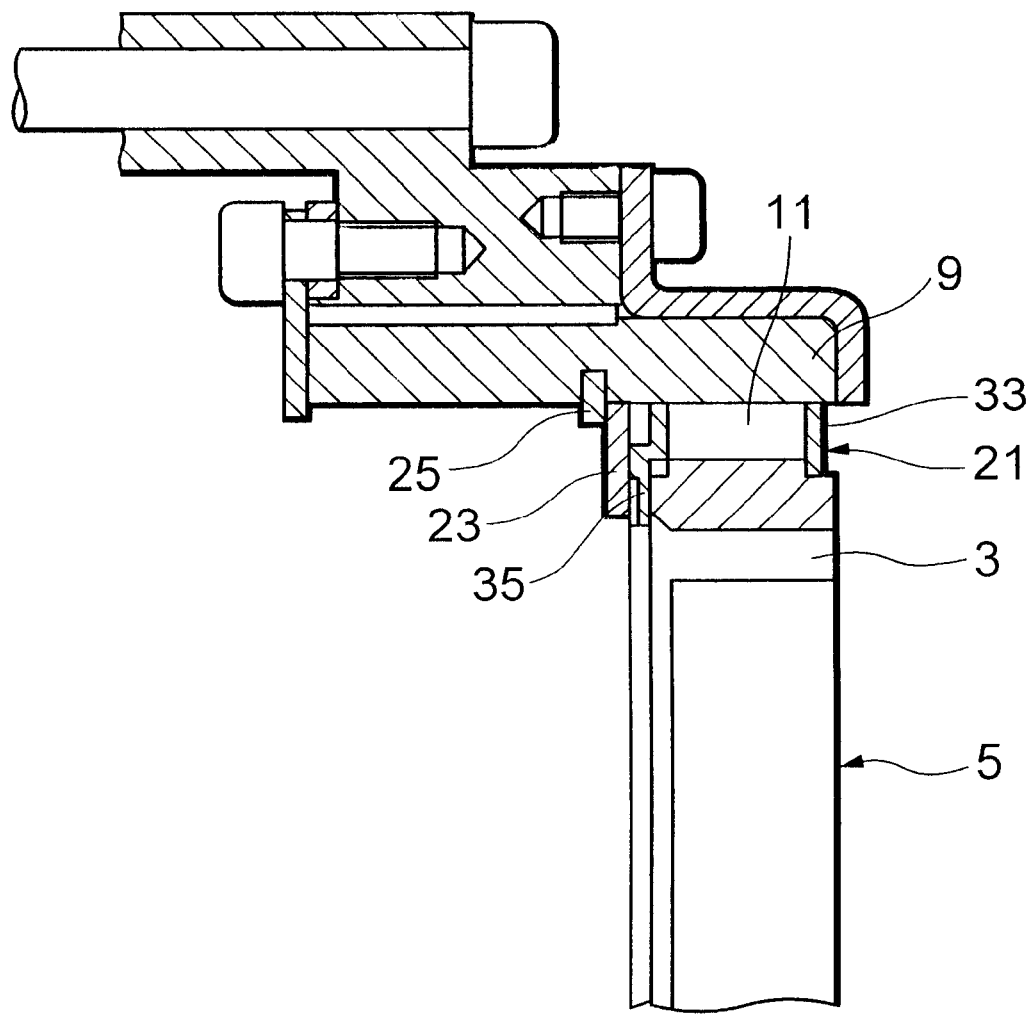
FIG. 2 is a cross-sectional view taken along line A—A in FIG. 1 in an enlarged manner.
Figure 3:
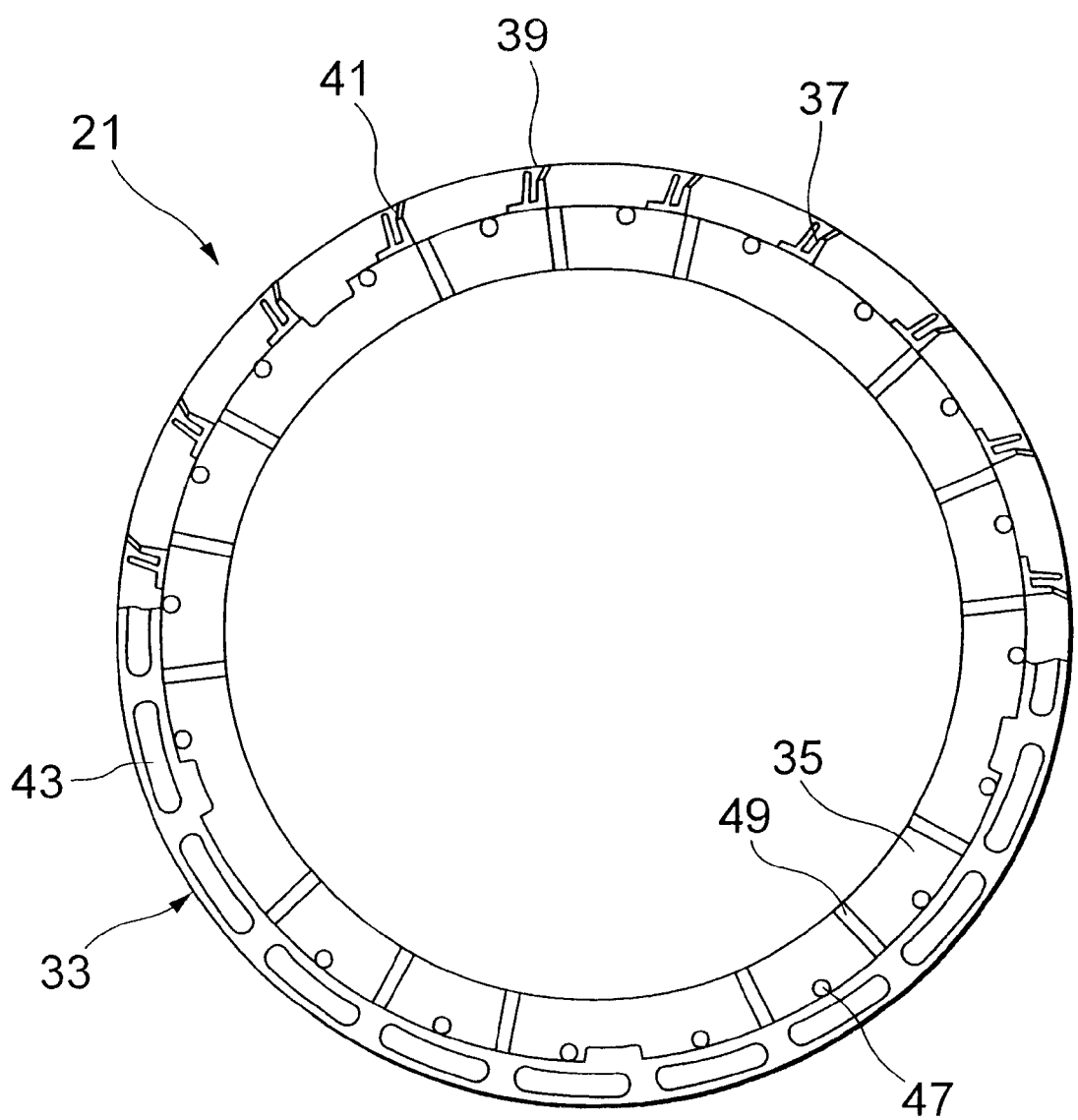
FIG. 3 is a back side view of a retainer.
Figure 4:
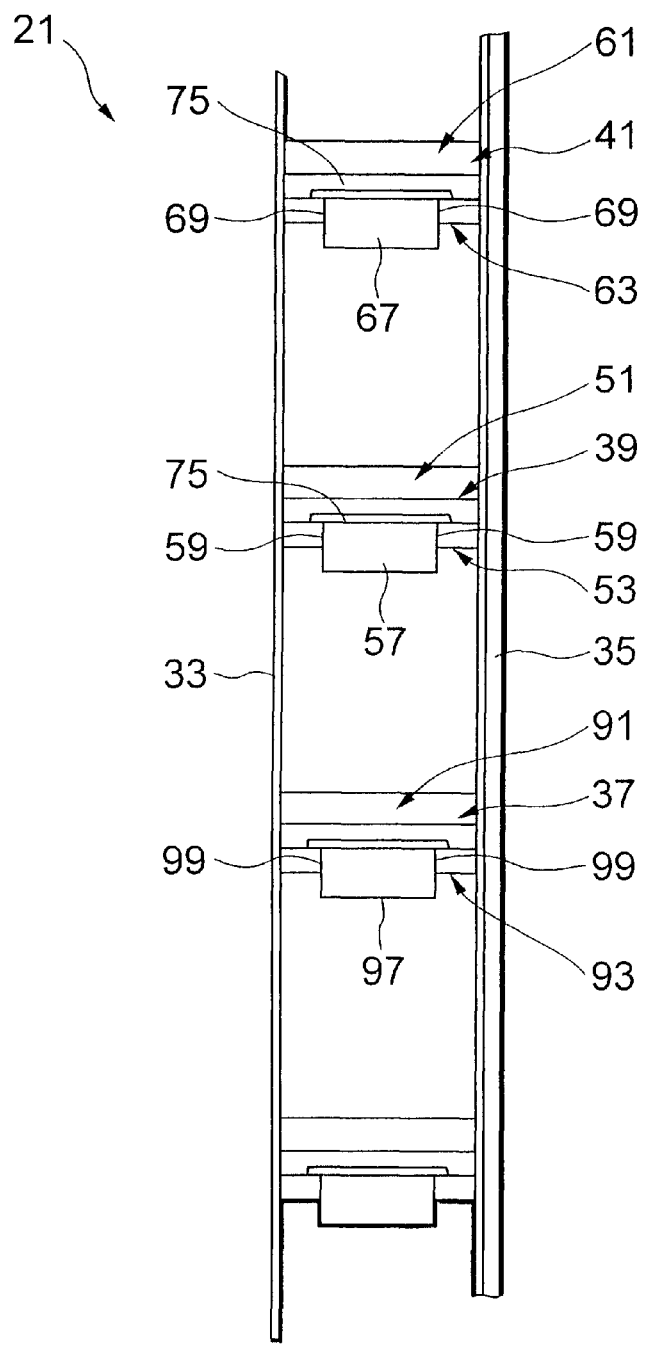
FIG. 4 is a plan view of the retainer.

Preferred embodiments of a oneway clutch device according to the present invention will be fully described with reference to the drawings. FIG. 1 is a front view of a oneway clutch device according to the first embodiment of the present invention, and FIG. 2 is a cross-sectional view taken along line A—A in FIG. 1 in an enlarged manner. FIG. 3 is a back side view of a retainer, and FIG. 4 is a plan view of the retainer. The oneway clutch device of the this embodiment is assembled in an automatic transmission, which, however, is not related to the gist of the present invention, so that description of the automatic transmission will be omitted. For convenience of the description of the embodiment, the left side in FIG. 2 is considered as the front side.

As shown in FIG. 1 and FIG. 2, the oneway clutch device 1 of the present embodiment is composed of an annular inner race 5 which has splines 3 on its inner peripheral surface, and a cylindrical outer race 9 which has splines 7 on its outer peripheral surface and is arranged to be rotatable coaxially and relatively with respect to the inner race 5, and a large number of rollers 11 which serve as torque transmitting members interposed between the inner race 5 and the outer race 9. On the outer peripheral surface of the inner race 5, a plurality of cam surfaces 13 are formed along the circumferential direction thereof and a plurality of latching grooves 15 are formed along the axial direction. Each of the rollers 11 is disposed between the inner peripheral surface of the outer race 9 and the cam surface 13, and is biased in the direction of engagement on the cam surface 13 by an accordion spring 17.

A block bearing 19 which is formed of oil-impregnated sintered alloy is engaged with each of the latching grooves 15. A distance between the inner race 5 and the outer race 9 is maintained by these block bearings. A member denoted by reference numeral 21 in FIG. 1 and FIG. 2 is a retainer which is formed of synthetic resin such as nylon or polypropylene by injection molding, for retaining the rollers 11, the accordion springs 17 and the block bearings 19 between the inner race 5 and the outer race 9. Also, a member denoted by reference numeral 23 is a side plate which is fitted in and retained by the outer race 9 to rotate relatively with respect to the rollers 11 and the inner race 5, and is restricted in its movement in the axial direction by a snap ring 25 which is engaged with the outer race 9.

As shown in FIG. 3 and FIG. 4, the retainer 21 is composed of a first and second flanges 33 and 35, and a first through third column portions 37, 39 and 41 for coupling both flanges 33 and 35 to each other. Since the outer surfaces of both flanges 33 and 35 slide against opposite members, it is required to supply lubricating oil in order to prevent friction due to a long-term use. For this purpose, dimples 43 are formed on both flanges, and oil grooves 45 are formed on the second flange 35 (see FIG. 1). Moreover, the second flange 35 is formed with communicating holes 47 for supplying the lubricating oil from the oil grooves 45 to the rollers 11 and the cam surfaces 13, and oil passages 49 for facilitating the supply of the lubricating oil to the inner peripheral surface of the outer race 9 (see FIG. 3).

Figure 5:
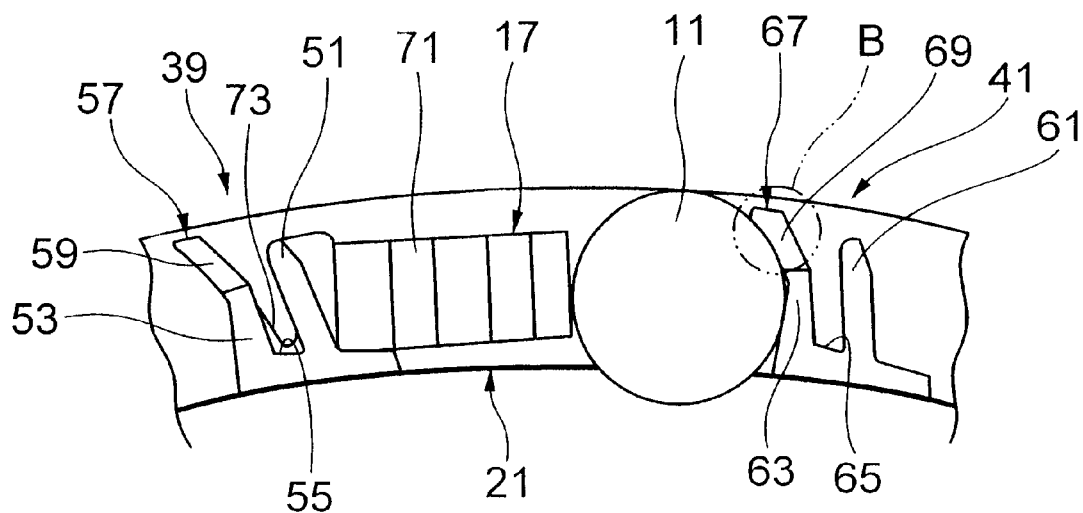
FIG. 5 is a view of an essential part of the oneway clutch device in an enlarged manner.
Figure 6:
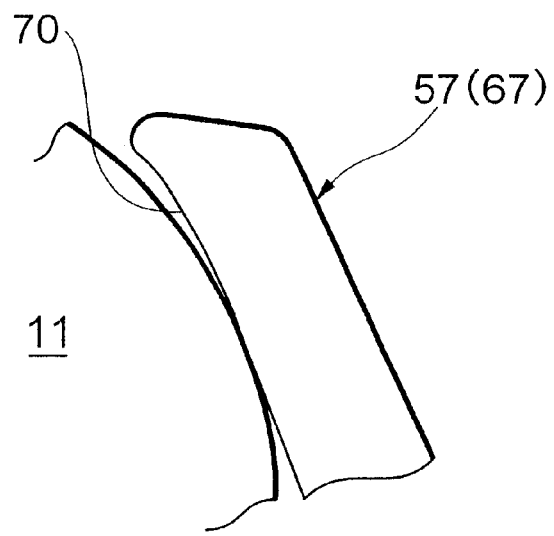
FIG. 6 is a view of a section B in FIG. 5 in an enlarged manner.

FIG. 5 is an enlarged view of an essential part of the oneway clutch device 1 in a subassembly state in which it is not yet assembled in the outer race 9, for showing the positions at which the roller 11 and the accordion spring 17 are retained. As shown in FIG. 4 and FIG. 5, the second column portion 39 has a pair of protrusions 51 and 53 and a recess 55 positioned between the protrusions 51 and 53. The upper part of the protrusion 53 is formed to serve as a roller latching piece 57, and notches or cuts 59 are formed on both sides of the roller latching piece 57 in the axial direction in order to enhance its flexibility. The third column portion 41 also has protrusions 61 and 63 and a recess 65, like the second column portion 39, so that the upper part of the protrusion 63 is formed as a roller latching piece 67, and notches or cuts 69 are formed on both sides of the roller latching piece 67 in the axial direction. In the present embodiment, each of the surfaces of the roller latching pieces 57 and 67 on the roller 11 side is formed as an srcuate surface 70 having a little larger radius than that of the roller 11, as shown in FIG. 6 (an enlarged view of the section B in FIG. 5).

The accordion springs 17 are composed of a pressing force generating portion 71 which is formed to be bent in a waveform, and an S-shaped attaching part 73 which has the tip end to be fitted to stretch in the recess 55 or 65. In a state in which the oneway clutch device 1 is not yet assembled in the outer race 9, the roller 11 is biased by the pressing force generating portion 71 of the accordion spring 17 and is pressed against the protrusion 53 or 63 of the second or third column portions 39 or 41. Then, since the upper parts of the protrusions 53 and 63 are formed as the roller latching pieces 67 each with the arcuate surface 70 having a little larger radius than that of the roller 11, the roller 11 is retained by the retainer 21 securely and stably. As a result, the roller 11 hardly ever falls from the oneway clutch device 1 even when it is in a state of a subassembly and not yet assembled in the outer race 9.

Figure 7:
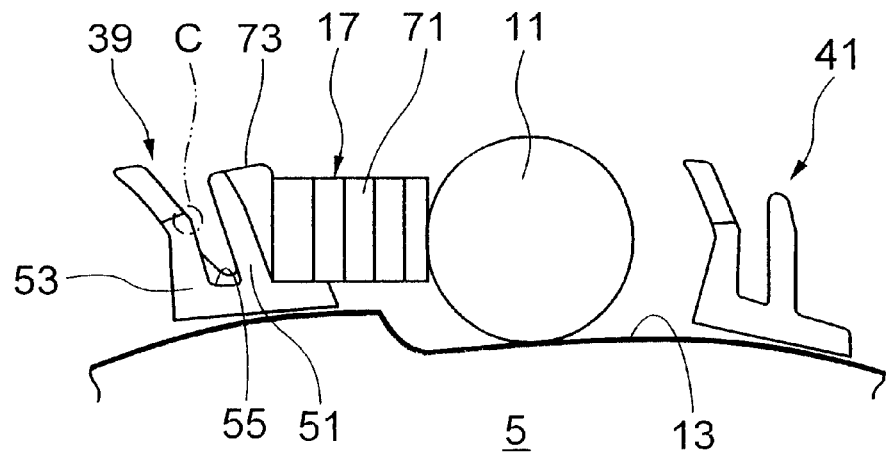
FIG. 7 is a view of an essential part of the oneway clutch device in an enlarged manner.
Figure 8:
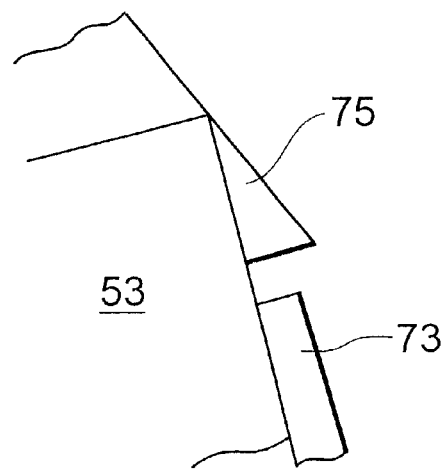
FIG. 8 is a view of a section C in FIG. 7 in an enlarged manner.

FIG. 7 is an enlarged view of the essential part of the oneway clutch device 1 in a state that it is assembled in the outer race 9. Like FIG. 5, this view shows the positions at which the roller 11 and the accordion spring 17 are retained. As shown in FIG. 4, FIG. 7 and FIG. 8 (an enlarged view of the portion C in FIG. 7), the protrusion 53 of the second column portion 39 is formed with a spring latching piece 75 serving as spring latching means projected to the recess 55 side thereof. The spring latching piece latches the end of the attaching part 73 of the accordion spring 17 in order to prevent the accordion spring 17 from slipping off upward. In this manner, together with the 55 side thereof. The spring latching piece 75 latches the end of the attaching part 73 of the accordion spring 17 in order to prevent the accordion spring 17 from slipping off upward. In this manner, together with the stretching of the attaching part 73 inside the recess 55 or 65, the accordion spring 17 is retained securely and steadily. As a result, it is possible to prevent falling or displacement of the accordion spring 17 from the retainer 21 even when the pressing force generating portion 71 is flexed or deformed repeatedly not only before, but also after the oneway clutch device 1 is assembled in the outer race 9.

Figure 9:
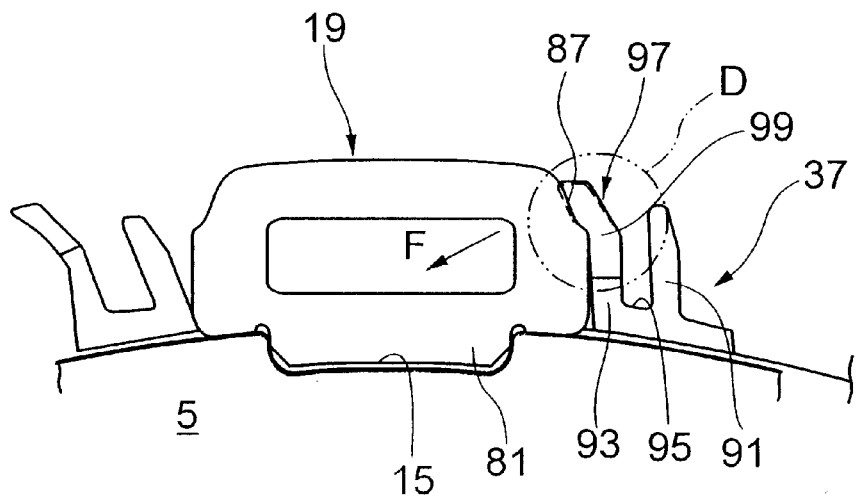
FIG. 9 is a view of an essential part of the oneway clutch device in an enlarged manner.
Figure 10:
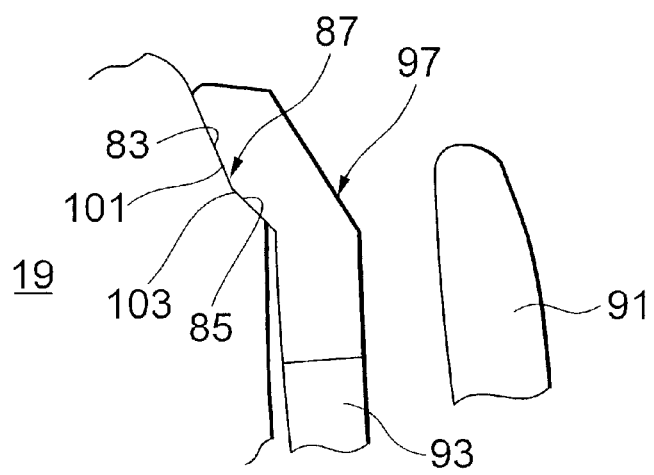
FIG. 10 is a view of a section D in FIG. 9 in an enlarged manner.

FIG. 9 is an enlarged view of the essential portion of the oneway clutch device 1, for showing the position at which the block bearing 19 is retained. The block bearing 19 is formed to have a hollow rectangular cross section, and a convex portion 81 to be fitted in the latching groove of the inner race 5 is formed on the bottom surface thereof. Also, as shown in FIG. 10 (an enlarged view of the section D in FIG. 9), a portion 87 to be pressed is formed by two planes or flat portions 83 and 85 having different inclinations on an upper part (a shoulder part) of the block bearing 19. On the other hand, the first column portion 37 of the retainer 21 has a pair of protrusions 91 and 93, and a recess 95 which is positioned between the protrusions 91 and 93. The upper part of the protrusion 93 serves as a block bearing pressing piece 97. Notches or cuts 99 are formed on both sides of the block bearing pressing piece 97 in the axial direction in order to enhance the flexibility thereof. Note that these notches or cuts 99 are formed to be larger than the notches or cuts 59 and 69 which are formed on the protrusions 53 and 63 of the second and third column portions 39 and 41, so that the flexibility of the block bearing pressing piece 97 is naturally larger.

The block bearing pressing piece 97 has two planes or a flat portions 101 and 103 having different inclinations, and these two planes or flat portions are brought into contact with the two planes or flat portions 83 and 85 of the to-be-pressed portion 87 of the block bearing 19. Since being formed to have a shape indicated by a broken line in FIG. 9 when it is not restrained, the block bearing pressing piece 97 presses the to-be-pressed portion 87 of the block bearing 19 with the counter action of elastic deformation. In this manner, the block bearing 19 receives the force in the direction indicated by the arrow F in FIG. 9, so that the bottom surface or the convex portion 81 of the block bearing 19 is brought into contact with the inner race 5 or the latching groove 15 with a predetermined pressing force. As a result, the block bearing 19 is held by and between the block bearing pressing piece 97 and the inner race 5 more securely, so as to prevent the block bearing 19 from falling from the inner race 5 or the retainer 21.

Figure 11:
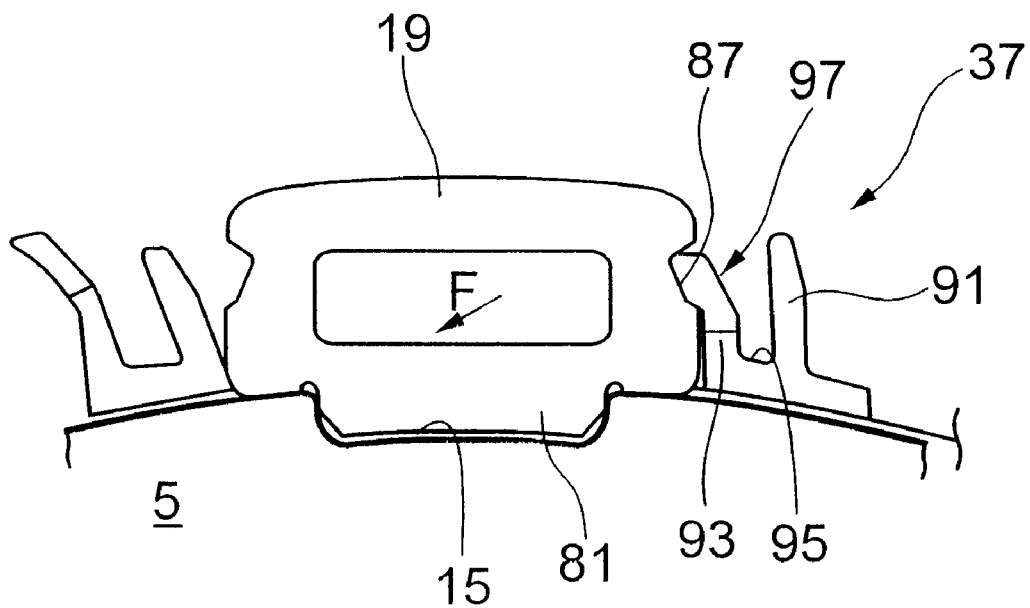
FIG. 11 is a view of an essential part for showing a partial variation of the first embodiment in an enlarged manner.

FIG. 11 is an enlarged view for showing an essential part of a partial modification of the first embodiment. This modification has a pressing manner of the block bearing 19 partially varied. In this modification, it is arranged such that the portion 87 to be pressed is formed on a side of the block bearing 19 and that portion 87 is pressed by the block bearing pressing piece 97. A manner of operation of this variation is the same as that of the first embodiment described above, except that an area of sliding contact between the block bearing 19 and the outer race 9 is larger.

Figure 12:
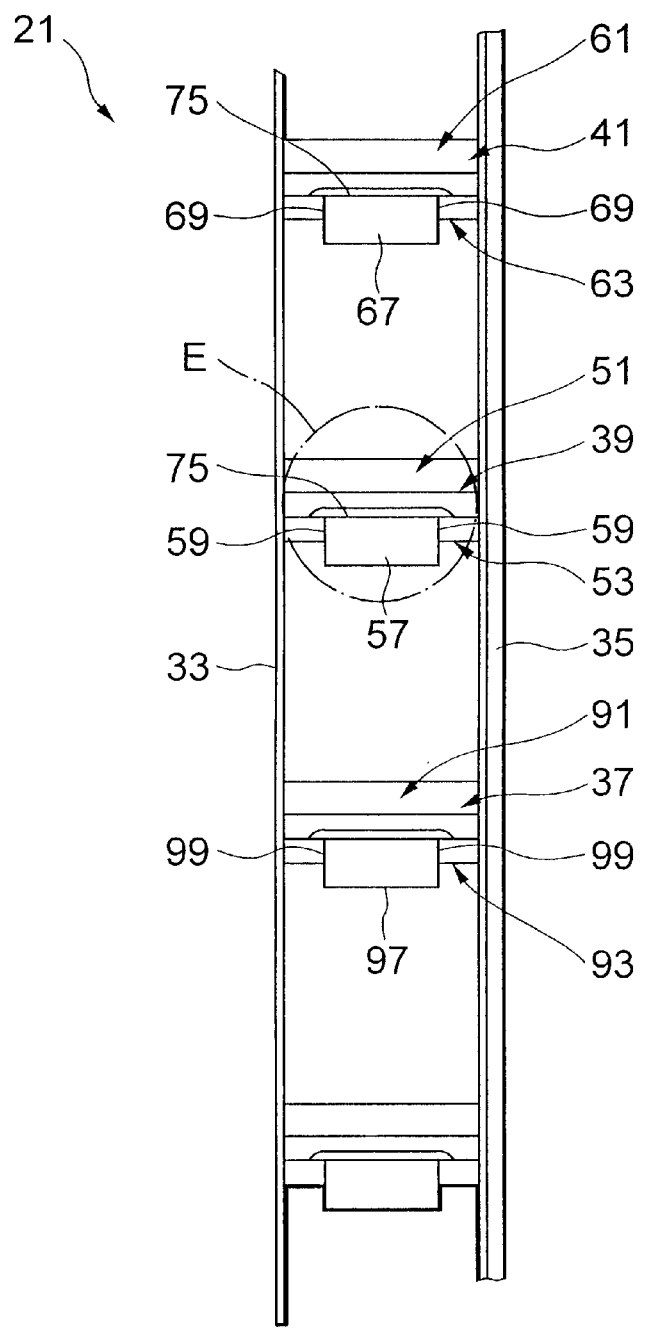
FIG. 12 is a plan view for showing a retainer according to another partial variation of the first embodiment.
Figure 13:
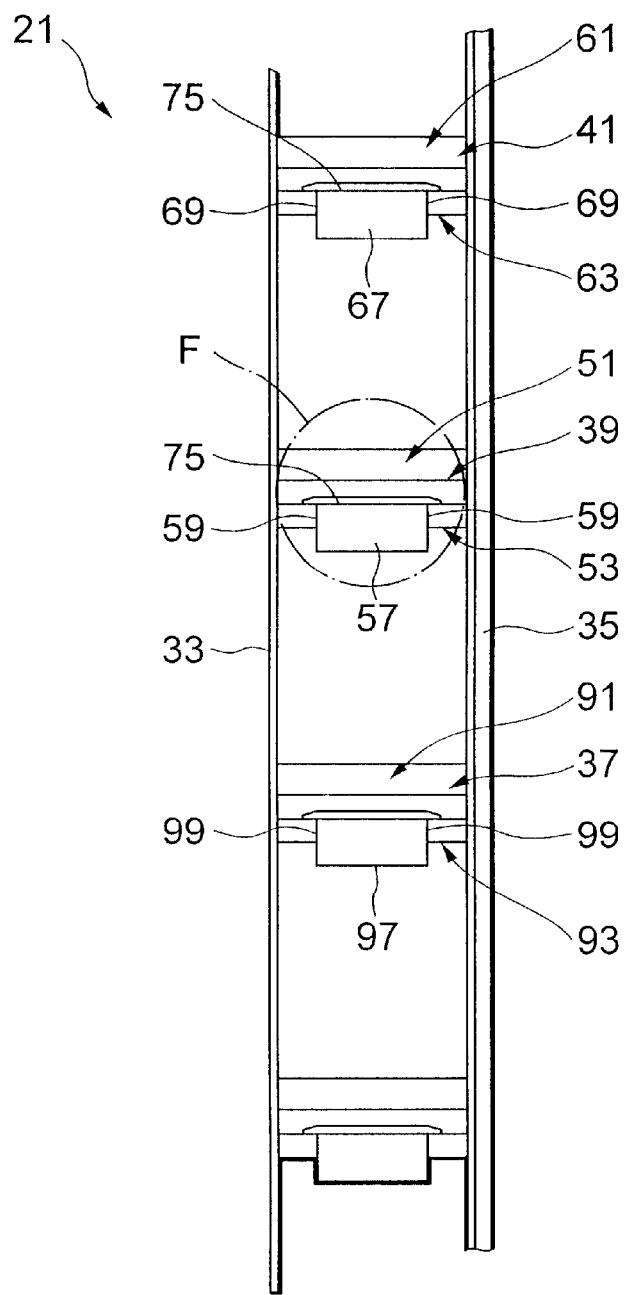
FIG. 13 is a plan view for showing another retainer according to a still another partial variation of the first embodiment.
Figure 14:
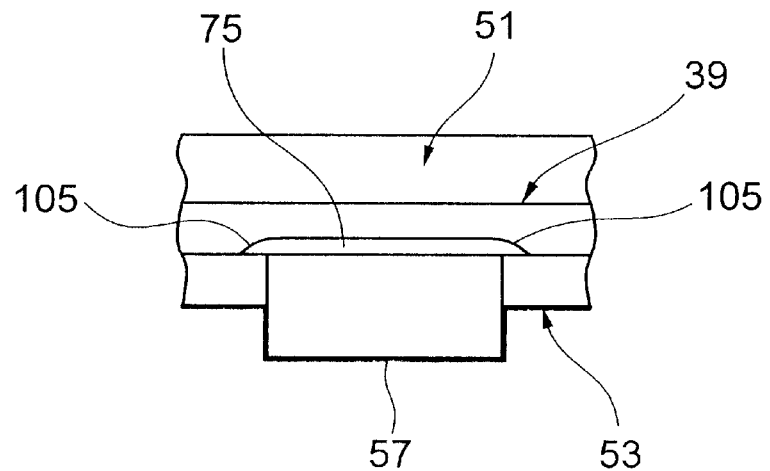
FIG. 14 is a view of a section E in FIG. 12 in an enlarged manner.
Figure 15:
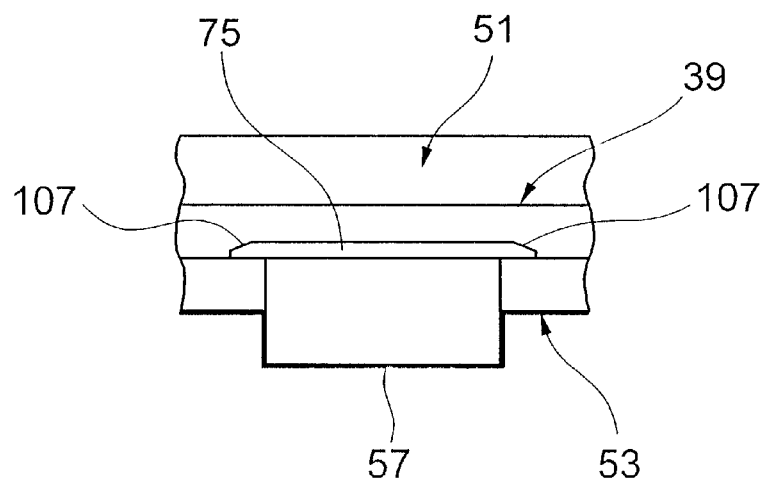
FIG. 15 is a view of a section F in FIG. 13 in an enlarged manner.

FIG. 12 and FIG. 13 are both plan views for showing retainers according to partial modifications of the first embodiment, corresponding to FIG. 4 described above. Each of the retainers of these partial modifications has substantially the same configuration as that of the first embodiment described above. However, as shown in FIG. 14 (an enlarged view of the section E in FIG. 12) and FIG. 15 (an enlarged view of the section F in FIG. 13), both ends of the spring latching piece 75 may be formed to be arcuate (105) (FIG. 14), or chamfered (107).

Figure 16:
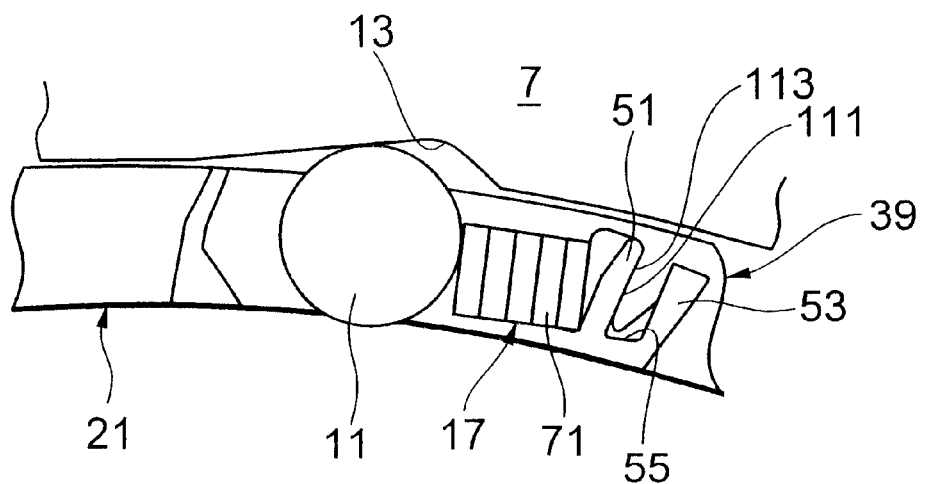
FIG. 16 is a view for showing an essential part of a oneway clutch device according to a second embodiment of the present invention in an enlarged manner.
Figure 17:
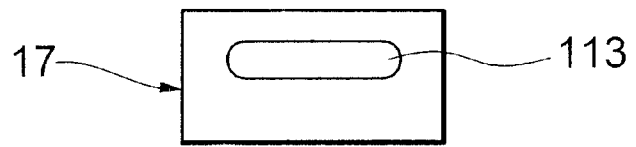
FIG. 17 is a view of an essential part of an accordion spring according to the second embodiment in an enlarged manner.

FIG. 16 is an enlarged view of an essential portion of a oneway clutch device according to a second embodiment of the present invention, and FIG. 17 is an enlarged view of an essential portion of an accordion spring according to the second embodiment. The second embodiment has substantially the same configuration as that of the first embodiment described above, except that a cam surface is formed on the outer race side and an accordion spring 17 is retained in a different manner. Specifically, in the second embodiment, a spring latching bump 111 is formed on the back surface of the protrusion 51 of the column portion 39, while an elliptic latching hole 113 is formed on the accordion spring 17 at a position corresponding to the latching bump 111.

In the second embodiment, the latching bump 111 is fitted in a latching hole 113 in the assembled state, whereby the accordion spring 17 is retained securely and steadily in the same manner as in the first embodiment. As a result, it is possible to prevent falling or displacement of the accordion spring 17 from the retainer 21 even when the pressing force generating portion 71 is flexed or deformed repeatedly not only before, but also after the oneway clutch device 1 is assembled in the inner race 5.

Figure 18:
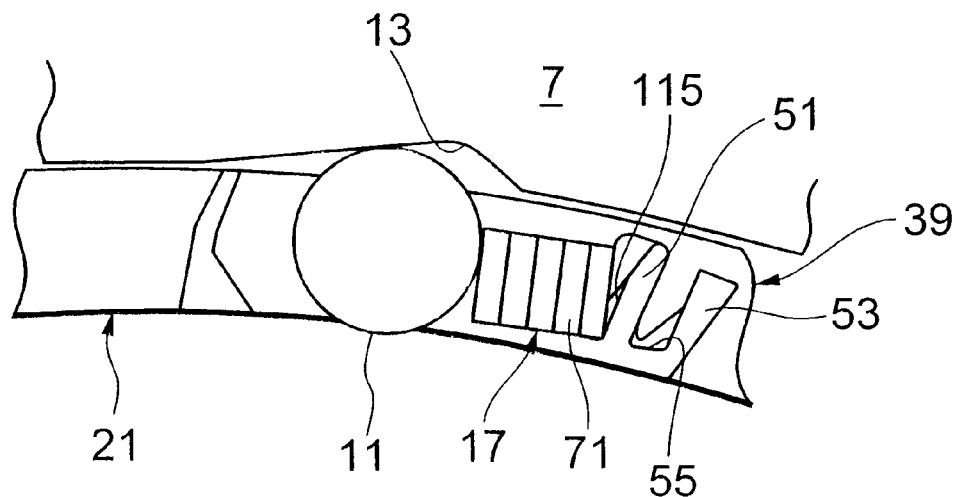
FIG. 18 is a view for showing an essential part of a oneway clutch device according to a third embodiment of the present invention in an enlarged manner.
Figure 19:
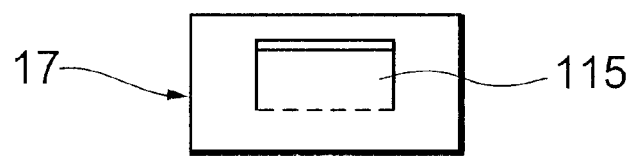
FIG. 19 is a view of an essential part of an accordion spring according to the third embodiment in an enlarged manner.
Figure 20:
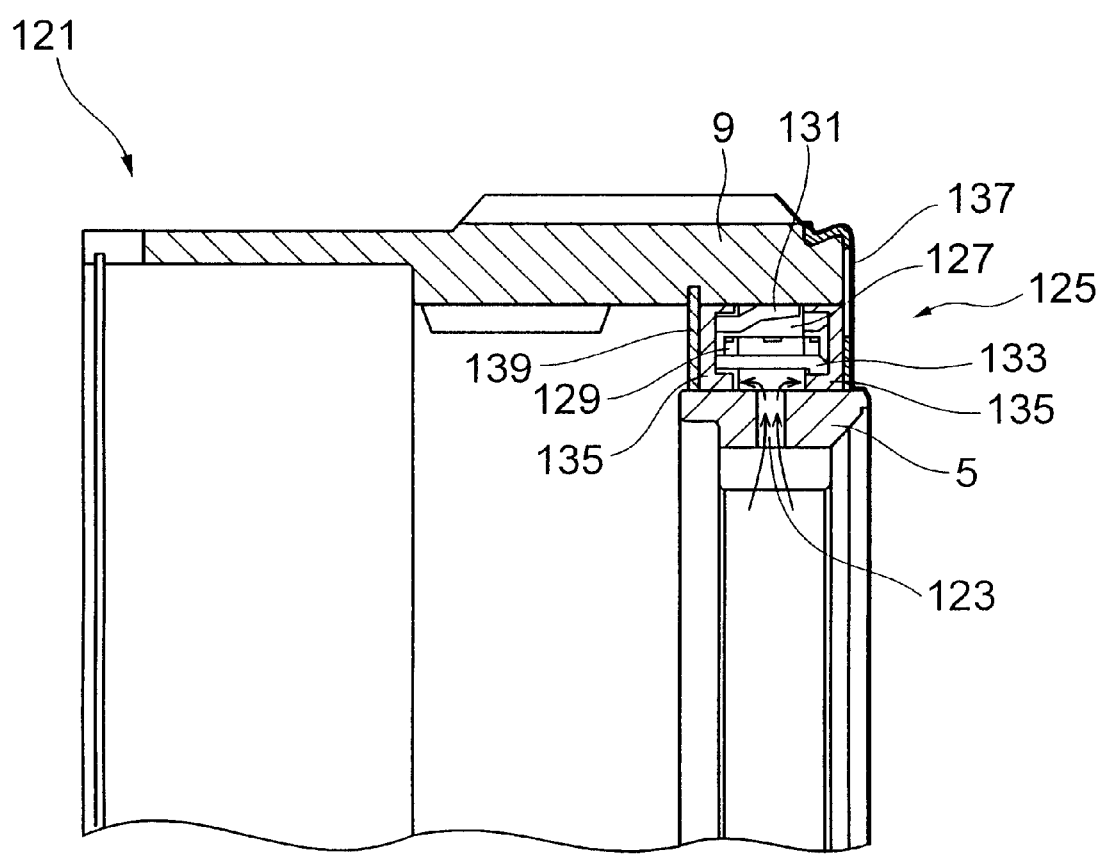
FIG. 20 is a longitudinal cross-sectional view of an essential part of a conventional oneway clutch device.

FIG. 18 is an enlarged view of an essential portion of an oneway clutch device according to a third embodiment of the invention, and FIG. 19 is an enlarged view of an essential portion of an accordion spring according to the third embodiment. The third embodiment has also substantially the same configuration as that of the first embodiment described above, except that a cam surface is formed on the outer race side and an accordion spring 17 is retained in a different manner. Specifically, in the third embodiment, a clapper 115 is formed on the accordion spring 17 by a so-called cut-up. This clapper 115 is brought into contact with the front surface of the protrusion 51 of the column portion 39 with a predetermined elastic force.

While being elastically deformed when the accordion spring 17 is assembled in the retainer 21, the clapper 115 of the third embodiment intrudes upon the front surface of the protrusion 51 when the power for causing the accordion spring 17 to fall from the retainer 21 is applied onto the accordion spring 17, in order to prevent the falling. In this manner, the accordion spring 17 is retained securely and steadily in the same manner as in the first embodiment. As a result, it is possible to prevent falling or displacement of the accordion spring 17 from the retainer 21 even when the pressing force generating portion 71 is flexed or deformed repeatedly not only before, but also after the oneway clutch device 1 is assembled in the inner race 5.

Though the specific explanation of the preferred embodiments is as described above, the present invention is not limited to these embodiments. For example, the size, the form, the layout, and the number of the spring latching means for latching the accordion spring or the block bearing pressing piece for pressing and holding the block bearing may be determined taking the productivity, or the like, into consideration, so long as they can restrict the movements of these members. Other arrangements such as the entire structure of the oneway clutch device or the specific shape of each of the constituent parts can be properly varied within the scope and the spirit of the present invention.

What is claimed is:

1. A subassembly for a oneway clutch, the subassembly being devoid of an outer race member, being constructed for assembly in an outer race member having a raceway on an inner periphery thereof, and comprising:

an inner member having a predetermined number of concave cams on an outer periphery thereof, the inner member being concentric with said outer race member when said subassembly is assembled in said outer race member;

torque transmitting members provided in respective concave cams;

biasing members for biasing corresponding torque transmitting members toward a torque transmitting position;

a retainer retaining said torque transmitting members and said biasing members;

grooves extended in an axial direction and formed at predetermined positions on an outer peripheral side of said inner member;

block bearings fitted in respective grooves through first apertures provided on said retainer corresponding to said grooves in order to position said retainer in a circumferential direction;

said retainer comprising a first annular side member, a second annular side member, and pole portions connecting said first annular side member and said second annular side member in the axial direction; and said pole portions, together with said first and second annular side members, defining said first apertures and further defining second apertures retaining said torque transmitting members and said biasing members;

wherein at least one pole portion of each of first predetermined paired adjacent pole portions defining said first apertures is formed with a radially outwardly protruding portion by which a corresponding block bearing is held in a corresponding groove of said inner member; and one of two pole portions of second predetermined paired adjacent pole portions defining said second apertures is provided with at least a radially protruding latching portion for latching a corresponding torque transmitting member to the torque transmitting position biased by a corresponding biasing member.

2. A subassembly for a oneway clutch according to claim 1, wherein the other of said two pole portions of said second predetermined paired adjacent pole portions defining said apertures is provided with at least two radially outwardly protruding portions to support the corresponding biasing member, and each of said biasing members comprises a clip-shaped portion which bends around one of said radially outwardly protruding portions of the corresponding second predetermined paired adjacent pole portions to pinch said one protruding portion and is fixed to the other of said two radially outwardly protruding portions, and an end portion which is engaged with said one of said two radially outwardly protruding portions.

3. A subassembly for a oneway clutch according to claim 2, wherein said one of said two radially outwardly protruding portions is formed with a projection for latching said end portion of said biasing member.

4. A subassembly for a oneway clutch according to claim 1, wherein said radially outwardly protruding latching portion of said first predetermined paired adjacent pole portions is shaped to have elasticity to hold the corresponding block bearing in the corresponding groove.

5. A subassembly for a oneway clutch according to claim 4, wherein said radially protruding latching portion of said first predetermined paired adjacent pole portions has a recess shaped so as to embrace a shoulder of the corresponding block bearing.

6. A subassembly for a oneway clutch according to claim 1, wherein said radially outwardly protruding latching portion of said second predetermined paired adjacent pole portions is shaped to have elasticity to hold the corresponding torque transmitting member.

7. A subassembly for a oneway clutch according to claim 6, wherein said radially outwardly protruding latching portion of said second predetermined paired adjacent pole portions has a recess shaped so as to embrace the corresponding torque transmitting member.

8. A subassembly for a oneway clutch according to claim 1, wherein said retainer has an integral structure of plastic.

* * * * *